United States Patent
Hansen et al.

(10) Patent No.: US 7,421,942 B2
(45) Date of Patent: Sep. 9, 2008

(54) GREASE COLLECTION SYSTEM FOR OVEN

(75) Inventors: William J. Hansen, Pewaukee, WI (US); Janus Bartelick, Brown Deer, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 755 days.

(21) Appl. No.: 10/829,492

(22) Filed: Apr. 22, 2004

(65) Prior Publication Data

US 2005/0235980 A1  Oct. 27, 2005

Related U.S. Application Data

(60) Provisional application No. 60/464,681, filed on Apr. 22, 2003.

(51) Int. Cl.
*A47J 37/06* (2006.01)

(52) U.S. Cl. .............. 99/400; 99/446; 99/473; 99/340

(58) Field of Classification Search .......... 99/446, 99/400, 473, 340
See application file for complete search history.

(56) References Cited

U.S. PATENT DOCUMENTS 2,097,793 A * 11/1937 Howell ................. 99/446
4,071,019 A * 1/1978 King ..................... 126/299 E
5,812,060 A * 9/1998 DeSpain et al. ........... 340/618
6,362,458 B1  3/2002 Sargunam et al.
6,435,078 B1  8/2002 Batten et al.

FOREIGN PATENT DOCUMENTS

DE  840 588 C  6/1952
DE  196 36 123 C  1/1998

OTHER PUBLICATIONS

Derwent Abstract with diagram for BR 9705607. Jul. 6, 1999.*
Abstract for BR 9705607 from Brazilian Patent Office website (INPI) with translation from Babel Fish translation. Jul. 6, 1999, (http://pesquisa.inpi.gov.br/).*
Translation of DE 19636123. Jan. 1998. http://ep.espacenet.com.*

* cited by examiner

*Primary Examiner*—Anthony Weier
(74) *Attorney, Agent, or Firm*—Quarles & Brady LLP

(57) ABSTRACT

A grease collection system is provided that may be connected to an oven for the real-time removal of grease from the heating chamber while maintaining a closed system. In particular, one end of a grease removal conduit is placed in communication with a drain in the cooking chamber, and the other end of the conduit is placed in a portable reservoir for the disposal of grease having a predetermined fluid level to prevent ambient air from entering the heating chamber during the preparation of food product.

16 Claims, 5 Drawing Sheets

US 7,421,942 B2

GREASE COLLECTION SYSTEM FOR OVEN

CROSS-REFERENCE TO RELATED APPLICATIONS

This patent application claims priority to U.S. Provisional Application Ser. No. 60/464,681 filed Apr. 22, 2003, the disclosure of which is hereby incorporated by reference as if set forth in its entirety herein.

STATEMENT REGARDING FEDERALLY SPONSORED RESEARCH OR DEVELOPMENT

BACKGROUND OF THE INVENTION

The present invention relates generally to ovens, and in particular, relates to an oven having a system for the automatic removal of grease from the heating chamber.

Conventional ovens include standard convection ovens, steamers, and combination oven/steamers, such as those commercially available under the trademark Combitherm® from Alto-Shaam®, Inc, located in Menomomee Falls, Wis. that utilize steam, heated air or a combination of both for steaming, baking, roasting, thawing, reheating, and various other cooking functions. The combination oven/steamer is compact and especially desirable in commercial kitchens that are traditionally limited in space. These ovens, steamers and combination ovens/steamers (collectively referred to herein as "ovens" for the purposes of clarity and convenience) can rely on both gas and electricity to supply heat, and are thus said to be available commercially as gas and electric devices.

Any of these conventional ovens may be used when preparing food product, such as poultry and the like that produce a significant amount of grease when cooked. Currently, commercial kitchens and the like that are used to prepare high volumes of poultry and other food products that produce a large volume of fat/grease when cooked (also referred to herein as "grease producing food product") suffer from inefficiencies. For instance, grease that accumulates at the bottom of the cooking chamber must be periodically removed, which requires that the user periodically stop the cooking process and remove the grease droppings from the oven. The interruption in food preparation decreases the efficiency of food preparation efforts. Furthermore, if grease remains in the chamber, subsequent cleaning processes will be required with increasing frequency, as removal of all grease disposed within the cooking chamber is impractical and overly tedious. The chef must then also manually dispose of the grease droppings, which can be a messy and time consuming process. Additionally, ovens that accumulate a significant amount of grease are subject to a higher volume of routine maintenance operations.

What is therefore needed is a method and apparatus for the automatically removing and disposing of grease droppings from ovens in a more efficient manner than currently achieved by conventional ovens.

BRIEF SUMMARY OF THE INVENTION

In accordance with one aspect of the invention, an oven is provided having a grease collection system. The oven includes a heating housing defining an internal heating chamber that supplies heat to raw grease-emitting food product to produce prepared food product from the raw food product. A drain is disposed at a base of the heating housing in communication with the heating chamber. A portable container is placed in proximity to the drain. The container defines an internal grease collection reservoir containing a fluid of sufficient amount to maintain at least a predetermined fluid level. A grease removal conduit is connected to the drain at a first end, and in communication with the reservoir at a second end that extends below the predetermined fluid level. The conduit receives grease emitted during heating of the food product and delivers the emitted grease to the reservoir.

These and other aspects of the invention are not intended to define the scope of the invention for which purpose claims are provided. In the following description, reference is made to the accompanying drawings, which form a part hereof, and in which there is shown by way of illustration, and not limitation, preferred embodiments of the invention. Such embodiments do not define the scope of the invention and reference must be made therefore to the claims for this purpose.

BRIEF DESCRIPTION OF THE DRAWINGS

Reference is hereby made to the following figures in which like reference numerals correspond to like elements throughout, and in which.

DETAILED DESCRIPTION OF THE PREFERRED EMBODIMENT

Figure 1:
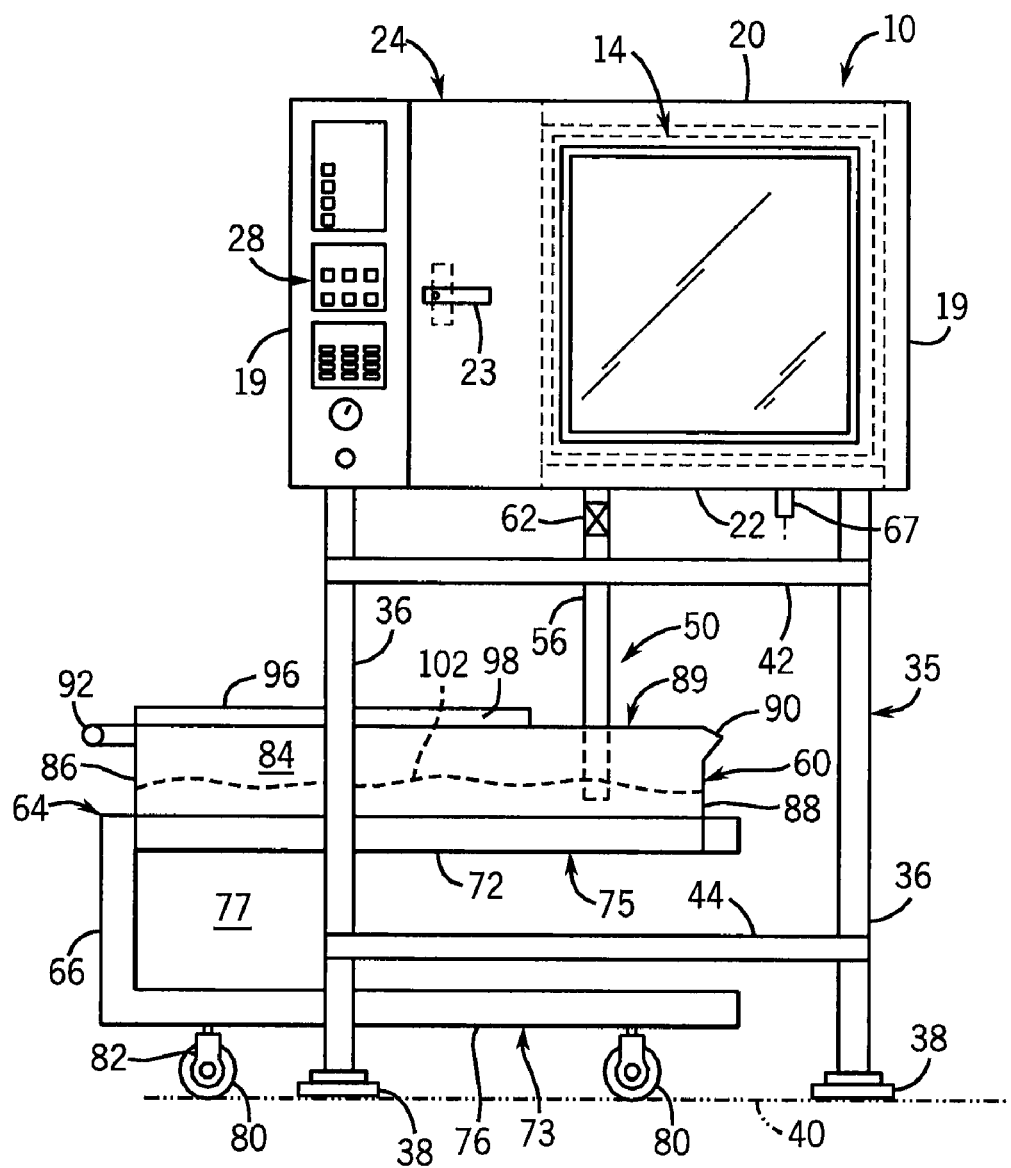
FIG. 1 is a schematic front elevation view of an oven incorporating a grease collection system constructed in accordance with a preferred embodiment of the invention
Figure 2:
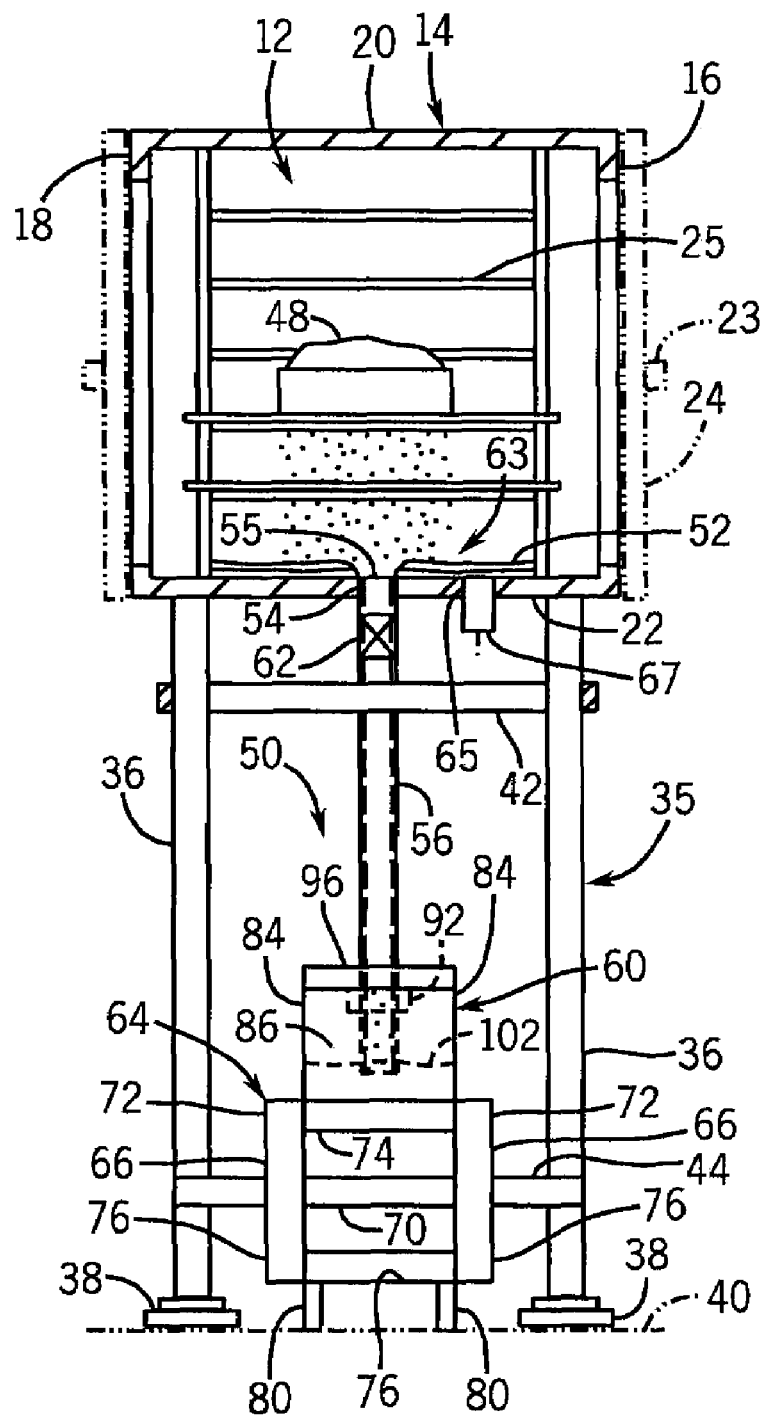
FIG. 2 is a schematic sectional side elevation view of the oven illustrated in FIG. 1.
Figure 3:
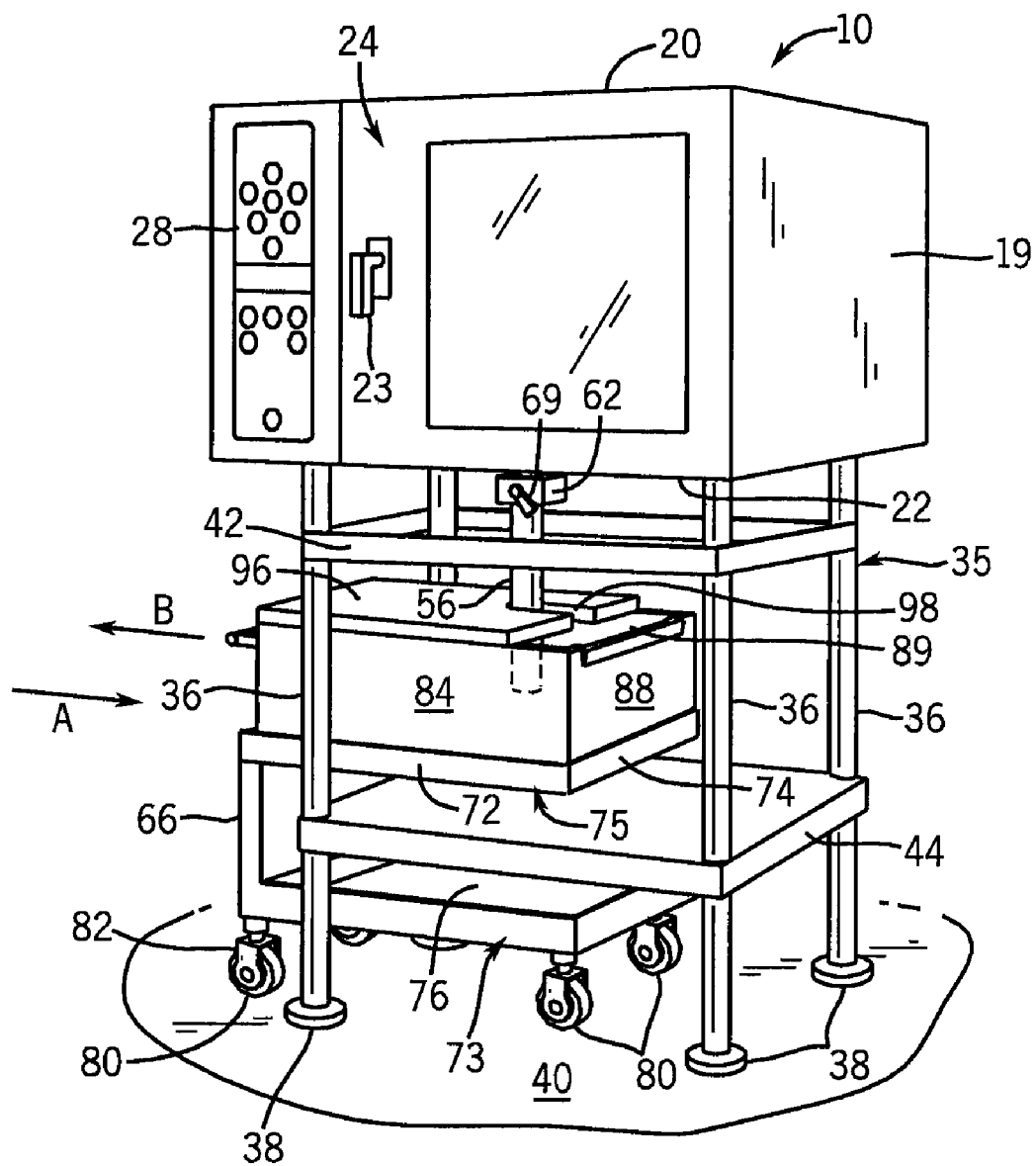
FIG. 3 is a perspective view of the oven and grease collection system illustrated in FIG. 1.

Referring to FIGS. 1-3, a commercial oven 10 is provided of the type that uses convective or other suitable heating elements, that can be electrically or gas powered, to prepare cooked food product. Oven 10 includes a pair of opposing side walls 19 that are connected at their upper and lower ends to an upper wall 20 and base 22 that are, in turn, connected at their front and rear ends to front end wall 16 and rear end wall 18, respectively. A generally rectangular cooking housing 14 is thus defined that contains the heating elements, and whose interior provides a heating chamber 12. A door 24 is hingedly connected to front end wall 16, and may be opened and closed by a traditional handle 23 to provide selective access to the heating chamber 12.

A plurality of racks 25 extends horizontally between side walls 16 and 18 within the heating chamber 12. A first aperture 65 extends through base 22 and is connected to a conduit 67 for the drainage of condensation produced during preparation of food product, as is well known in the art. Oven 10 includes standard operating controls 28 disposed adjacent door 24, that include a timer, temperature control, and other inputs and outputs typically used when performing a food preparation sequence as understood by one having ordinary skill in the art. Food product 48 is thus supported on racks 25 with door 24 in a closed position during the food preparation sequence, and can removed from the racks upon completion of the preparation sequence.

Oven 10 is supported by a support stand 35 that includes a plurality of vertical legs 36 extending down from base 22. The lower ends of legs 36 terminate at supports 38 that rest on a surface, such as a kitchen floor 40. Support stand 35 further includes a plurality of horizontal support rails 42 that are connected between the upper ends of legs 36 slightly below oven base 22. Rails 42 provide additional structure that resists twisting and other instability of support stand 35. A flat rectangular plate 44 is connected at each corner to the lower ends of legs 36 at a location slightly above supports 38, and provides further structural support for stand 35.

A substantial amount of grease 63 may be produced and emitted into the heating chamber 12 during a food preparation sequence of certain food products when prepared in bulk, for example poultry. The grease that would otherwise collect in chamber 12 can be removed during a food preparation sequence (without disrupting the food preparation sequence) using a grease collection system 50 constructed in accordance with the preferred embodiment. Advantageously, grease collection system 50 automatically removes grease from chamber 12, thus preventing the build-up of grease within chamber 12, during a food preparation sequence while, at the same time, maintaining a closed system to ensure that that flavored gasses produced while cooking do not escape from housing 12.

Those skilled in the art recognize that grease produced during cooking is not to be expelled from ovens into conventional drains, such as drain 65. Accordingly, a second aperture 54 extends through base 22 and provides a drain for the expulsion of grease 63 from the oven 10. Grease collection system 50 further includes a horizontal drip pan 52 that sits above the upper surface of base 22 of housing 12 and initially receives the grease 63 that is emitted from the food product 48 during preparation. A drain 55 extends through drip pan 52 in alignment with aperture 54. Drip pan 52 may be sloped to force the emitted grease 63 into the drain 54. Accordingly, when food is being prepared that is expected to produce a high volume of grease, drip pan 52 is installed into heating chamber 12 in the manner described above.

Because drip pan 52 does not have a drain in alignment with aperture 65, the installation of drip pan 52 into heating chamber 12 prevents grease and other condensation from flowing into condensation drain 65, and instead directs all emitted grease and condensation into drain 55. Of course, if a grease producing food product is not being prepared, pan 52 can be removed to enable condensation to flow into drain 65.

A flexible elongated grease removal conduit 56 (preferably a rubber tube) provides a flow path for grease to travel from drain 54 into a grease collection bucket 60. Bucket 60 includes a pair of opposing sidewalls 84 that are connected to opposing front and rear walls 86 and 88, respectively, that are supported by a base (not shown) to define an internal reservoir 91 having an open upper end for the collection and temporary storage of grease 63 that is produced during a food preparation sequence. Reservoir 91 preferably stores sixty liters of fluid, though it should be appreciated that the volume of bucket 60 can vary without departing from the scope of the present invention. A spout 90 extends out from the upper end of rear end wall 88, and a handle 92 extends out from the upper end of front wall 86.

Bucket 60 is supported by a cart 64 that includes a lower frame section 73 connected to an upper frame section 75 at their front end via the lower and upper ends, respectively, of a pair of spaced vertical legs 66. A horizontal support beam 70 is connected between legs 66 to provide structural support for the cart 64.

Upper frame section 75 includes a pair of horizontal rails 72 that extend rearward from the upper ends of legs 66. Rails 72 are connected at their rear ends to a horizontal rail 74. Rails 72 are preferably formed from elongated "L brackets" that define a periphery aligned with the periphery of the base of bucket 60, which is seated in the frame provided by rails 72. Lower frame section 73 includes a horizontal plate 76 that extends rearward from the lower ends of legs 66.

The combination of legs 66, upper frame section 75 and lower frame portion 73 defines an internal C-shaped void 77 that is in vertical alignment with plate 44, and configured to accept plate 44 when the cart 64 is placed into operating position with respect to oven 10. Because plate 76 and rails 72 are located below plate 44, and rails 72 and 74 are located above plate 44, interference is avoided between cart 64 and plate 44 during operation.

A plurality of casters 80 are located at the front and rear ends of plate 76 to support movement of support cart 64. Front casters 80 include foot-activated brakes 82 that can be actuated to lock the cart 64 in place, for example when the bucket 60 is positioned beneath cooking chamber 14.

As described above, conduit 56 is connected to drain 54 at an upper end, and terminates at a lower end that is disposed in reservoir 91. Preferably, a predetermined volume of water or like fluid is introduced into reservoir 91 to produce a predetermined minimal fluid level 102 that is at least approximately two inches high, or at least high enough to allow the lower end of conduit 56 to be immersed in the preexisting fluid. A horizontal plate 96 is disposed on top of bucket 60, and in particular, extends rearward from the upper edge of front wall 86 and is supported by the upper edges of sidewalls 84. Plate 96 provides splash guard for prevent grease and other liquids flowing into bucket 60. Plate 96 terminates prior to reaching rear end wall 88 to define a gap 89 at the rear of the upper end of bucket 60. Plate 96 defines a U-shaped groove 98 that extends forward from the rear end of the plate and is centered with respect to sidewalls 84 of bucket 60. Groove 98 is thus configured to easily receive conduit 56.

It should be appreciated that grease removal conduit 56 can further include a shut-off valve 62 that is disposed below drain 54. Valve 62 can be opened to enable grease to flow from chamber 12 to the collection bucket 60, and can be subsequently closed to prevent grease from traveling into bucket 60 when, for instance, the bucket 60 is to be emptied, as will be described in more detail below. Furthermore, if a food product is to be prepared that will not emit a high volume of grease, drip pan 52 can be removed and valve 62 can be closed to remove condensation from heating chamber 12 via drain 65. It should be appreciated that valve 62 can be a manually actuated valve that is opened and closed using a knob or like handle 69 that extends out from the valve 62. Alternatively, valve 62 may be an automatic valve that is electrically connected to the oven circuitry and opened and closed by the user via controls 28. Alternatively still, controls 28 can be programmed to automatically open vale 62 upon initiation of a food preparation process, and closed when a sensor inside reservoir 91 (not shown) determines that the actual fluid level 102 has reached a predetermined level indicating that bucket 60 is to be emptied. Sensor 91 can further be used in combination with a processor (now shown) inside control 28 to provide a visible or audible indication if the fluid level has falls below the predetermined fluid level that might jeopardize the closed system.

During operation, cart 64 is inserted forward along the direction of Arrow A into operational position, whereby the front legs 66 approach or abut the front end of plate 44. Grease removal conduit 56 can then be inserted into groove 98 of plate 96. Alternatively, cart 64 can be inserted forward to a location such that conduit 56 can be inserted into gap 89 and, as cart 64 moves further forward, conduit slides inside groove 98 until cart 64 is in its full forward position. Once cart 64 and bucket 60 have been properly positioned, brake 82 is actuated to prevent further movement of the cart 64 during operation until bucket 60 is to be drained.

Because a predetermined fluid level 102 is present in reservoir 91 before conduit 56 is inserted, the lower end of conduit is immersed in the preexisting fluid. The fluid 102 creates a seal at the lower end of conduit 56 to ensure that heat, moisture, and flavor will not escape from the heating chamber 12 via conduit 56. Furthermore, aperture 65 can be plugged when drain 54 is in use. Hence, the grease collection system 50 said to be a closed system.

Once cart 64 has been properly positioned and conduit 56 is placed in reservoir 91, a food preparation sequence can be initiated via controls 28 to begin cooking raw food product 48. Valve 62 can be opened before or after initiation of the cooking sequence to place heating chamber 12 in fluid communication with bucket 60 while maintaining a closed system. The grease emitted by food product 48 during preparation falls to drip pan 52 and accumulates thereon until flowing into drain 54, through grease removal conduit 56, and into bucket 60 under gravitational forces. Because grease has a density greater than water, the grease will flow into the reservoir 91 as opposed to backing up inside conduit 56. Once reservoir 91 becomes substantially filled, bucket 60 may be emptied using one of several methods.

Figure 4:
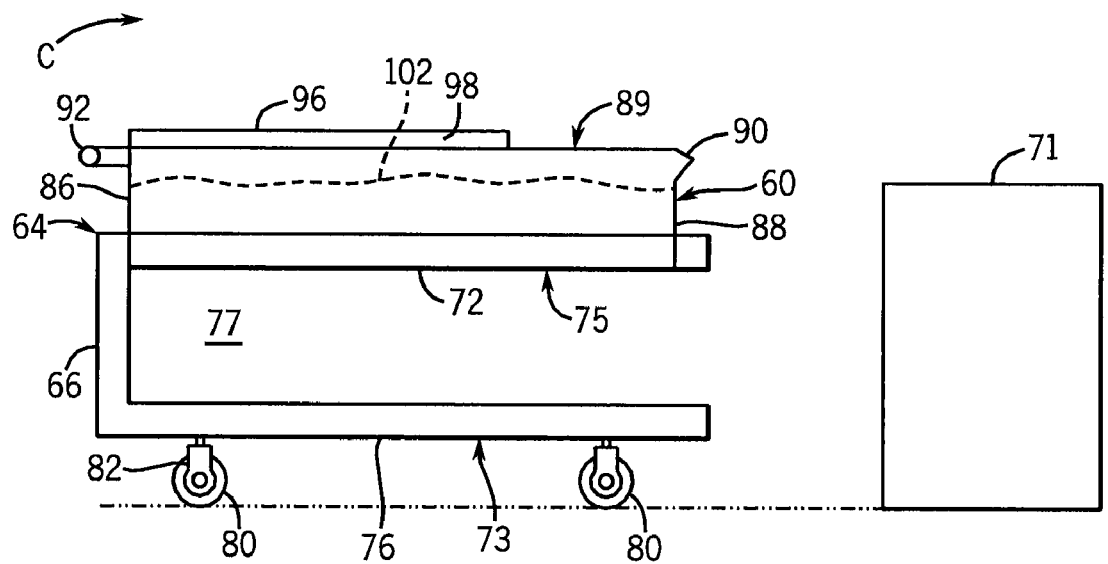
FIG. 4 is a schematic side elevation view of the grease collection system illustrated in FIG. 1 illustrating grease removal.

In accordance with a first method, valve 62 is closed to enable the removal of cart 64 and bucket 60 along the rearward direction of Arrow B while preventing the leakage of grease 63 from conduit 56. Furthermore, closing valve 62 prevents ambient air from entering the heating chamber 12. Advantageously, grease collection system 50 allows the cooking sequence to continue uninterrupted while bucket 60 is emptied. Bucket 60 is removed by first releasing brake 82 and sliding cart 64 rearward. Referring also to FIG. 4, cart 64 is subsequently transported to a suitable grease drainage site 71, whereby bucket 60 may be tilted forward using handle 92 along the direction of Arrow C such that the grease stored in reservoir 91 is delivered to the drainage site 71 via spout 90.

Figure 5:
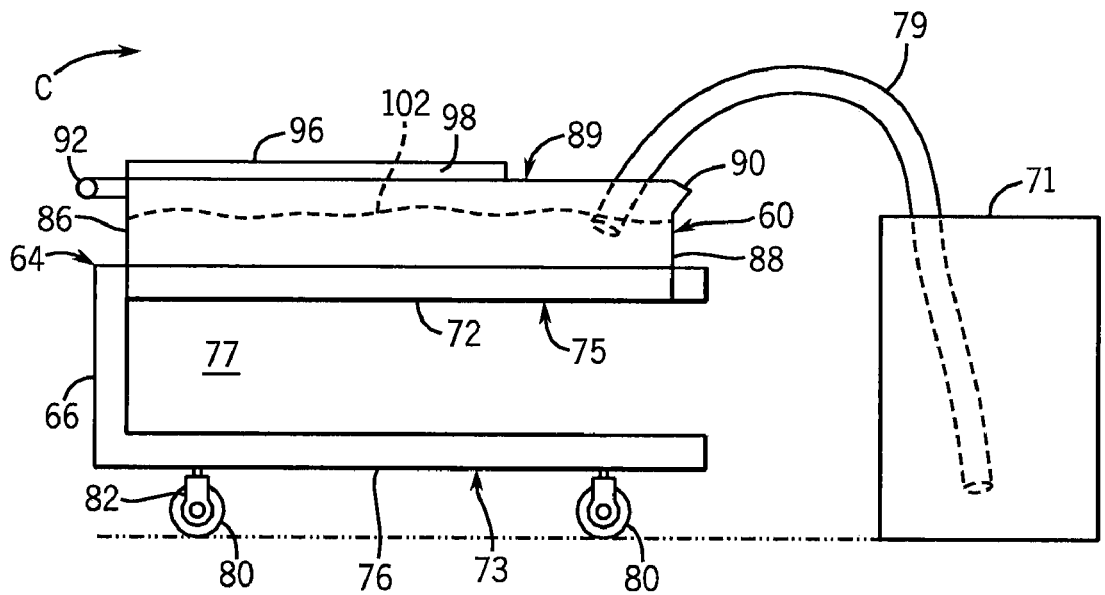
FIG. 5 is a schematic side elevation view of the grease collection system illustrating grease removal in accordance with an alternate embodiment.

Referring to FIG. 5, an alternative method recognizes that a siphon tube 79 can be inserted into bucket 60 and provided with the usual vacuum to remove grease from bucket 60. If the siphon tube 79 is emptied into a grease drainage site 71 that is located remote from oven 10, the fluid communication between heating chamber 12 and bucket 60 is terminated by closing valve 62, and brakes 82 are be deactivated to transport the cart 64, and bucket 60, to the drainage site 71 as described above. The cart 64 and bucket 60 are subsequently placed into operational position once the grease has been removed from reservoir 91. Flexible grease removal conduit 56 is placed within reservoir 91, and valve 62 is once again opened to drain any grease that has accumulated from cooking chamber 12 into reservoir 91.

It should further be appreciated that grease may be siphoned from reservoir 91 without having to transport the bucket 60 to a remote location. For instance, if the siphon tube has a sufficient length, or if the grease drainage site 71 is located in close proximity to oven 10, the cart 64 may remain in-place with valve 62 open while the accumulated grease is removed from bucket 60. Advantageously, the cooking sequence can continue without actuating valve 62 when it is necessary to empty the bucket 60.

When bucket 60 is emptied in accordance with any of the embodiments discussed above, it is desirable to leave a layer of grease in the reservoir 91. Alternatively, all grease may be removed and a predetermined amount of liquid (e.g., water) may be added to ensure that the closed system is maintained when conduit 56 is inserted into bucket 60.

Figure 6:
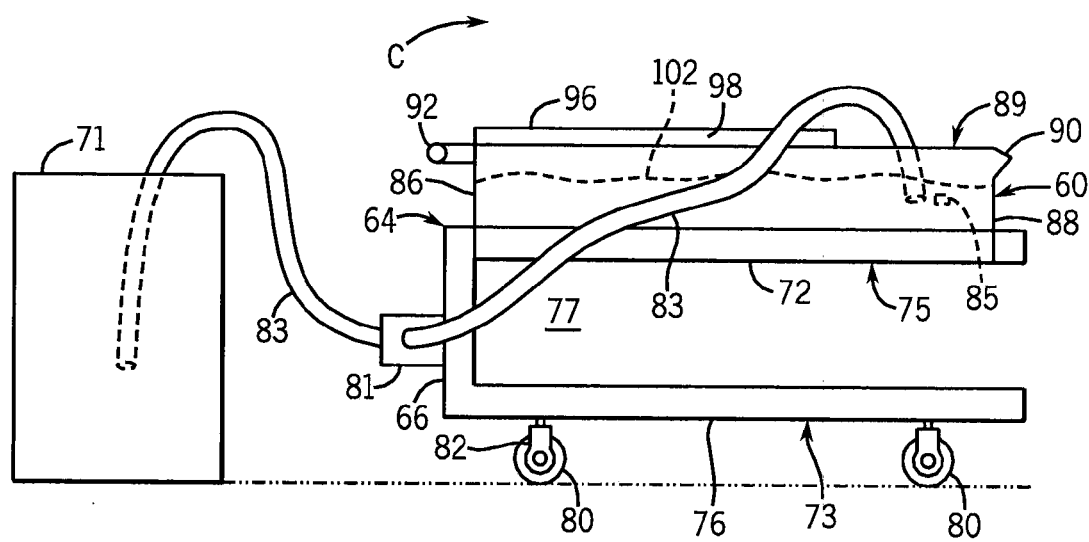
FIG. 6 is a schematic side elevation view of the grease collection system illustrating grease removal in accordance with an alternate embodiment.

Referring now to FIG. 6, another alternative embodiment recognizes that a pump 81 may be mounted onto cart 64 or otherwise provided for operation in combination with bucket 60. Tubing 83 may thus extend between pump 81 and cart 64 at one end, and between pump and grease drainage site 71 at the other end. Pump 81 is operable to provide vacuum pressure within the tubing 83 to transport contained grease from bucket 60 to grease drainage site 71. Preferably the tubing 83 extends down into the cart 64 no further than the lower end of grease removal conduit 56 to ensure that an adequate fluid level remains after the grease is removed from the cart 64. It should be appreciated that pump 81 may be activated and deactivated manually, or that a sensor 85 can be provided to automatically activate the pump 81 (e.g., via controls 28) once the grease reaches a predetermined level in the cart 64. Pump 81 would also be automatically deactivated once a sufficient volume of grease has been removed from the cart 64.

It should thus be appreciated that the present invention is especially advantageous for high volume continuous cooking processes, in particular those that are used to prepare high grease content foods such as poultry and the like. In particular, grease collection system 50 enables grease produced during the cooking sequence to be automatically removed from the oven and disposed of while enabling continuous food preparation. Furthermore, the removal of grease during the cooking sequence further enables easier and less frequent routine cleaning of cooking chamber 12.

Advantageously, while grease collection system 50 provides an apparatus that can be included in the construction of an oven for automatically removing grease during a food preparation sequence without interrupting the food preparation, the present invention can also be easily installed in a pre-fabricated oven. In particular, a drain (if not already present) can be formed in the base of an oven, and connected to the upper end of conduit 56. The remaining components of system 50 can then be provided as described above.

In accordance with the preferred embodiment, oven 10 is an oven and/or steamer commercially available under the trademark Combitherm® from Alto Sham, Inc. located in Menominee Falls, Wis. Such devices are available in several models having cooking elements that may include electric coils or gas burners disposed within the chamber 12 to prepare the food product via convection. More preferably, oven 10 is a model 7.14 gas, or a model 10.18 electric Combitherm®oven. It should further be appreciated that ovens may further include cooking elements that are configured to receive a water supply, and evaporate the water to produce a steam that is introduced into the heating chamber to prepare a steamed food product therein. In this regard, it should be appreciated that oven 10 may prepare food via convection, steam, or a combination of both. Furthermore, the present invention is not limited a Combitherm® oven, but rather is intended to include any device having a cooking chamber for the preparation of a raw food product.

It should further be appreciated that grease collection system 50 may be included and installed with any suitable oven, including a pass-through oven of the type described in pending patent application Ser. No. 10/078,845 filed Feb. 19, 2002 and entitled, "Oven Chamber Having a Pass-Through" design, the disclosure which is hereby incorporated by reference as if set forth in its entirety herein.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. An oven comprising:
   a heating housing defining an internal heating chamber that supplies heat to raw grease-emitting food product to produce prepared food product from the raw food product;
   a drain disposed at a base of the heating housing in communication with the heating chamber;
   a portable container placed in proximity to the drain, wherein the container defines an internal grease collection reservoir containing a fluid of sufficient amount to maintain at least a predetermined fluid level; and
   a grease removal conduit connected to the drain at a first end, and in communication with the reservoir at a second end that extends below the predetermined fluid level, wherein the conduit receives grease emitted during heating of the food product and delivers the emitted grease to the container;
   wherein the fluid has a fluid density that is different than a grease density of the grease delivered to the container.

2. The oven as recited in claim 1, wherein the heating housing further includes a drip pan located above the drain and defining an opening in alignment with the drain.

3. The oven as recited in claim 2, wherein the drip pan is sloped towards the opening.

4. The oven as recited in claim 2, wherein the heating housing further comprises a second drain for the removal of non-grease condensation.

5. The oven as recited in claim 4, further comprising a valve disposed in the conduit that can be actuated to control fluid flow from the drain to the reservoir.

6. The oven as recited in claim 1, wherein the container further comprises a spout that delivers accumulated grease to a grease drainage site.

7. The oven as recited in claim 1, wherein the container further comprises a siphon tube that delivers accumulated grease to a grease drainage site.

8. The oven as recited in claim 1, further comprising a pump connected to first tubing that extends into the reservoir, and second tubing that extends to a grease drainage site, wherein the pump is operable to provide a force that delivers accumulated grease from the reservoir to the grease drainage site.

9. The oven as recited in claim 8, further comprising a sensor located in the reservoir that senses a fluid level and automatically disconnects the pump when a grease fluid level reaches the predetermined level.

10. The oven as recited in claim 1, wherein the fluid density is less than the grease density.

11. The oven as recited in claim 10, wherein the fluid is a water-like fluid.

12. The oven as recited in claim 11, wherein the fluid is water.

13. The oven as recited in claim 1, wherein the grease removal conduit forms a seal with the fluid to create a closed system.

14. The oven as recited in claim 13, wherein the closed system prevents the escape of gasses from the heating housing.

15. The oven as recited in claim 1, wherein the fluid is disposed in the portable container prior to receiving grease emitted during heating of the food product.

16. The oven as recited in claim 4, wherein drip pan is not in fluid communication with the second drain.

* * * * *